US007247680B2

(12) United States Patent
Marechal

(10) Patent No.: US 7,247,680 B2
(45) Date of Patent: Jul. 24, 2007

(54) HIGH SHRINK POLYETHYLENE FILMS

(75) Inventor: Philippe Marechal, Nivelles (BE)

(73) Assignee: TOTAL Petrochemicals Research Feluy, Feluy (BE)

( * ) Notice: Subject to any disclaimer, the term of this patent is extended or adjusted under 35 U.S.C. 154(b) by 299 days.

(21) Appl. No.: 10/466,307

(22) PCT Filed: Jan. 11, 2002

(86) PCT No.: PCT/EP02/00381

§ 371 (c)(1),
(2), (4) Date: Mar. 29, 2004

(87) PCT Pub. No.: WO02/055601

PCT Pub. Date: Jul. 18, 2002

(65) Prior Publication Data

US 2005/0004314 A1 Jan. 6, 2005

(30) Foreign Application Priority Data

Jan. 12, 2001 (EP) ................................. 01100731

(51) Int. Cl.

| | |
|---|---|
| ***C08L 23/06*** | (2006.01) |
| ***B29D 22/00*** | (2006.01) |
| ***B32B 1/08*** | (2006.01) |
| ***B32B 27/06*** | (2006.01) |
| ***B05D 7/00*** | (2006.01) |
| ***B29C 55/10*** | (2006.01) |

(52) U.S. Cl. ................ 525/240; 428/36.91; 428/39.92; 428/515; 427/412.3; 264/290.2

(58) Field of Classification Search ................ 525/240; 428/36.91, 36.92, 515; 427/412.3; 264/290.2
See application file for complete search history.

(56) References Cited

U.S. PATENT DOCUMENTS

| | | | |
|---|---|---|---|
| 5,631,069 | A | 5/1997 | Wooster et al. |
| 5,674,342 | A | 10/1997 | Obijeski et al. |
| 6,114,486 | A | 9/2000 | Rowland et al. |

FOREIGN PATENT DOCUMENTS

| | | | |
|---|---|---|---|
| EP | 0844277 | A1 | 5/1998 |
| EP | 0870802 | A1 | 10/1998 |
| EP | 1108530 | A1 | 6/2001 |
| EP | 1108749 | A1 | 6/2001 |
| WO | WO 95/27005 | A1 | 10/1995 |
| WO | WO 96/14358 | A1 | 5/1996 |
| WO | WO 96/35729 | A1 | 11/1996 |
| WO | WO99/33913 | A1 | 7/1999 |

*Primary Examiner*—Nathan M. Nutter
(74) *Attorney, Agent, or Firm*—William D. Jackson

(57) ABSTRACT

A homogeneous blend of a low density polyethylene with a metallocene-catalysed polyethylene having a density of from 0.906 g/cm$^3$ and a Dow Rheology Index of at least 5/$MI_2$,$MI_2$ being the melt index measured according to ASTMD-1238 condition 190° C./2.16 kg and the Dow Rheology Index being determined by a dynamic rheological analysis performed at 190°.

20 Claims, No Drawings

HIGH SHRINK POLYETHYLENE FILMS

The present invention relates to polyethylene compositions and high performance shrink films thereof combining excellent mechanical properties such as stiffness and toughness with good processability and good optical properties. These polyethylene compositions can therefore be used for film applications requiring this unique combination of properties, such as but not exclusively, packaging.

Shrink film has been used for years in the packaging industry to wrap articles. The process comprises packing the article and submitting it to heating in an oven, whereby the film is retracted so as to render the packing tight and suitable to its end use.

It is well known to use linear low density polyethylene (LLDPE) in blend with low density polyethylene (LDPE) in shrink film compositions. Compositions comprising of from 20 to 40% by weight of LLDPE with 80 to 60% by weight of LDPE are commonly used. Indeed the addition of LLDPE to LDPE in shrink film compositions is well known in order to avoid the formation of holes that could occur during the retraction of shrink film made from pure LDPE.

Nevertheless the currently available polyethylene resins suffer from major drawbacks.

The low density polyethylene (LDPE) resins exhibit excellent optical and processing properties but they have poor mechanical properties and poor rigidity.

Linear low density polyethylene (LLDPE) resins have excellent mechanical properties but have mediocre optical properties and poor processability. Indeed LLDPE leads to bubble instability and its extrusion is difficult. If mixed with LDPE they have improved processability properties but their mechanical properties are reduced.

Metallocene-catalysed linear low density polyethylene (mLLDPE) resins have excellent mechanical properties but poor optical properties and processability requiring extrusion equipment specially designed for mLLDPE with wide die gap. If mixed with LDPE they have very good optical and good sealing properties, but the mechanical properties are reduced.

Wherever high rigidity is needed, LDPE and LLDPE compositions will require overly thick structures. Especially for LLDPE, where excellent impact and tear properties render its down-gauging capability useful, the lack of rigidity is a main drawback because high rigidity is a requirement for product packaging.

WO 95/27005 discloses mixtures of LDPE with LLDPE or mLLDPE. The rigidity of the mixtures is insufficient.

EP-A-0844277 discloses metallocene-catalysed medium density polyethylene with LDPE and/or LLDPE compositions for blown films that claim a good balance between the good optical properties of LDPE and the good mechanical and processing properties of medium density polyethylene (MDPE). However this specification does not address the problem of the production of shrinkable polyethylene films EP-A-1108749 relates to shrink films of blended LDPE and MDPE resins. However those resins can still be further improved.

It is an object of the present invention to provide polyethylene compositions for mono or multilayers films, that achieve good balanced shrink properties in machine direction (MD) and transverse direction (TD) with fast shrink speed and high cohesion force at room temperature while keeping a good rigidity, excellent optical properties and an easy processing in film blowing process.

In the present invention, a film is defined as an extremely thin continuous sheet: the upper limit for thickness is of about 250 microns (Hawley's Condensed Chemical Dictionary, Twelfth Edition, Rev. by R. J. Lewis, Van Nostrand Reinhold Co., New York)

In the present invention, good balanced shrink properties in machine and transverse directions of the polyethylene resin produced according to the invention is defined as a resin having a shrinkage value in transverse direction of at least 5%, preferably of at least 10% compared to known LDPE/LLDPE film while keeping shrinkage value in machine direction similar to LDPE/LLDPE film, LDPE/LLDPE films and films according to the blend of the invention being extruded in the same conditions.

In the present context, high cohesion force at room temperature of the polyethylene resin produced according to the invention is defined as a resin having a cohesion force in transverse direction greater than 5%, preferably greater than 10% compared to LDPE/LLDPE films.

Fast shrink speed of the polyethylene resin produced according to the invention is defined as a resin that shrinks of at least 10%, more preferably at least 20% faster than LDPE/LLDPE films.

Good optical properties of the polyethylene film produced according to the invention is here defined as a film having a gloss at an angle of 45° of at least 60 and a haze of less than 10%.

This invention relates to a homogeneous blend of a low density polyethylene (LDPE) with a metallocene-catalysed polyethylene (mPE) having a density of from 0.906 g/cm$^3$ and a Dow Rheology Index (DRI) of at least 5/MI$_2$, MI$_2$ being the melt index measured according to ASTMD-1238 condition 190° C./2.16 kg and the Dow Rheology Index being determined by a dynamic rheological analysis performed at 190°, this blend consisting of from 0.5% to 99.5% by weight of mPE and of from 99.5% to 0.5% by weight of LDPE, based on the total weight of the blend.

In this specification, the density of the polyethylene is measured at 23° C. using procedures of ASTM D-1505 and the melt index is measured according to ASTM D-1238 condition 190° C./2.16 kg.

Other polymers compatible with said blend can be added to the blend to a total amount not to exceed 33% by weight based on the total weight of the polymers.

The densities of the mPE used in the present invention are regulated by the amount of comonomer injected in the reactor; they will range from 0.906 g/cm$^3$ to less than 0.965 g/cm$^3$. Examples of comonomer which can be used include 1-olefins such as propylene, butene, hexene, octene, 4-methyl-pentene, and the like, as well as mixtures thereof up to C12 1-olefins, the most preferred being hexene. Ethylene can also be used as such without any addition of comonomers. Homopolymers of ethylene are then produced.

According to one embodiment, the density of the mPE will range from 0.906 g/cm$^3$ to less than 0.925 g/cm$^3$.

According to another embodiment, the density of the mPE will range from 0.925 g/cm$^3$ to less than 0.965 g/cm$^3$ preferably from 0.925 g/cm$^3$ to less than 0.950 g/cm$^3$.

The melt index of the mPE used in the present invention can be regulated by the amount of hydrogen injected in the reactor; it will range from 0.1 g/10' to 15 g/10', preferably from 0.2 g/10' to 4 g/10'

The molecular weight distribution (D) defined as the ratio between the average molecular weight by weight (Mw) and the average molecular weight by number (Mn) of the mPE used in the present invention is of from 2 to 8, preferably of from 2 to 4 and even more preferably of from 2 to 3.5.

The melt flow ratio of the mPE used in the present invention is of from 25 to 100. The melt flow ratio being the ratio HLMI/$MI_2$, the HLMI being measured according to ASTM D-1238, condition 190° C./21.6 kg and the $MI_2$ being measured according to ASTM D-1238, condition 190° C./2.16 kg.

The mPE resin used in the present invention has a high Dow Rheological Index (DRI). To characterize the rheological behavior of substantially linear ethylene polymers, S Lai and G. W. Knight introduced a new rheological measurement, the Dow Rheology Index (DRI) which expresses a polymer's "normalized relaxation time as the result of long chain branching" (ANTEC '93 Proceedings, Insite™ Technology Polyolefins (ITP)—New Rules in the Structure/Rheology Relationship of Ethylene & -Olefin Copolymers, New Orleans, La., May 1993). S. Lai et al defined the DRI as the extent that the rheology of ethylene-octene copolymers known as ITP (Dow's Insite Technology Polyolefins) incorporating long chain branching into the polymer backbone deviates from the rheology of the conventional linear homogeneous polyolefins that are reported to have no long chain branching by the following normalized equation:

$$DRI=(365000(t_0/\eta_0)-1)/10$$

wherein $t_0$ is the characteristic relaxation time of the material and $\eta_0$ is the zero shear viscosity of the material (Antec '94, Dow Rheology Index (DRI) for Insite™ Technology Polyolefins (ITP): Unique structure-Processing Relationships, pp. 1814-1815). The DRI is calculated from the best fitting by least squares analysis of the rheological curve (complex viscosity versus frequency) as described in U.S. Pat. No. 6,114,486 with the following generalized Cross equation, i.e.

$$\eta=\eta_0/(1+(\gamma t_0)^n)$$

wherein n is the power law index of the material, $\eta$ and $\gamma$ are the measured viscosity and shear rate data respectively. The dynamic rheological analysis is performed at 190° C. and the strain amplitude is 10%. Results are reported according to ASTM D 4440.

The DRI of the mPE used in the present invention is at least 5/$MI_2$, preferably at least 10/$MI_2$, more preferably at least 20/$MI_2$.

It has been observed that when the dynamic rheological analysis is performed at a temperature lower than 190° C., higher DRI values can be obtained compared to those obtained when the dynamic rheological analysis is performed at a temperature of 190° C. and vice versa.

Attention should thus be paid to the temperature at which the dynamic rheological analysis is performed when DRI values are compared.

DRI values ranging from zero for polymers which do not have measurable long chain branching to about 15 are known and have been described in several U.S. patents such as for example U.S. Pat. Nos. 6,114,486, 5,674,342, 5,631, 069.

The manufacture of the low density polyethylenes used in the present invention is known in the art and is described for example in "Encyclopedia of Polymer Science and Engineering", second edition, Volume 6, on pages 404 to 410 (LDPE) and pages 436 to 444 (LLDPE).

The catalyst system used to produce the polyethylene required by the present invention comprises a metallocene component. The metallocene component can be any metallocene component known in the art of the general formulas:

$$(Cp)_mMR_nX_q \qquad \text{I.}$$

wherein Cp is a cyclopentadienyl ring, M is a group 4b, 5b or 6b transition metal, R is a hydrocarbyl group or hydrocarboxy having from 1 to 20 carbon atoms, X is a halogen, and m=1-3, n=0-3, q=0-3 and the sum m+n+q is equal to the oxidation state of the metal.

$$(C_5R'_k)_gR''_s(C_5R'_k)MQ_{3-g}\text{and} \qquad \text{II.}$$

$$R''_s(C_5R'_k)_2MQ' \qquad \text{III.}$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring, R" is a $C_1$-$C_4$ alkylene radical, a dialkyl germanium or silicon or siloxane, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having 1-20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1 and k is 5 when s is 0, and M is as defined above.

Among the preferred metallocenes used one can cite among others bis tetrahydro-indenyl compounds and bis indenyl compounds as disclosed for example in WO 96/35729. The most preferred metallocene catalyst is ethylene bis (4,5,6,7-tetrahydro-1-indenyl) zirconium dichloride.

The metallocene may be supported according to any method known in the art. In the event it is supported, the support used in the present invention can be any organic or inorganic solids, particularly porous supports such as talc, inorganic oxides, and resinous support material such as polyolefin. Preferably, the support material is an inorganic oxide in its finely divided form and has a surface area comprised between 100 and 1200 $m^2$/g.

An active side must be created by adding a cocatalyst having an ionizing action. While alumoxane can be used as cocatalyst, it is not necessary to use alumoxane as cocatalyst during the polymerization procedure for preparing the mPE resin. When alumoxane is used as a cocatalyst, any alumoxane known in the art can be used. The preferred alumoxanes comprise oligomeric linear and/or cyclic alkyl alumoxanes represented by the formula:

$$R-(\underset{\displaystyle R}{\underset{|}{Al}}-O)n-AlR2 \qquad \text{(I)}$$

for oligomeric, linear alumoxanes and $$(-\underset{\displaystyle R}{\underset{|}{Al}}-O-)m \qquad \text{(II)}$$

for oligomeric, cyclic alumoxanes, wherein n is 1-40, preferably 10-20, m is 3-40, preferably 3-20 and R is a C1-C 8 alkyl group and preferably methyl.

Methylalumoxane is preferably used.

The amount of alumoxane and metallocene usefully employed in the preparation of the solid support catalyst can vary over a wide range. Preferably the aluminium to transition metal mole ratio is in the range between 20:1 and 500:1, preferably in the range 50:1 and 300:1.

When alumoxane is not used as a cocatalyst, one or more aluminium alkyl represented by the formula $AlR_x$ are used wherein each R is the same or different and is selected from halides or from alkoxy or alkyl groups having from 1 to 12 carbon atoms and x is from 1 to 3. Especially suitable aluminiumalkyl are trialkylaluminium, the most preferred being triisobutylaluminium (TIBAL).

In the present invention, the mPE can be monomodal, bimodal or multimodal.

The metallocene catalyst utilized to produce the polyethylene required by the present invention can be used in gas, solution or slurry polymerizations. Preferably the polymerization process is conducted under slurry phase polymerization conditions. It is preferred that the slurry phase polymerization conditions comprise a temperature of from 20 to 125° C., preferably from 60 to 110° C. and a pressure of from 0.1 to 8 MPa, preferably from 2 to 5 MPa for a time between 10 minutes and 4 hours, preferably between 0.4 and 2.5 hours. High pressure range like 100 to 2000 bars can be used for polymerization in high pressure tubular or autoclave reactors.

It is preferred that the polymerization reaction be run in a diluent at a temperature at which the polymer remains as a suspended solid in the diluent. Diluents include, for examples, propane, isobutane, n-hexane, n-heptane, methylcyclohexane, n-pentane, n-butane, n-decane, cyclohexane and the like as well as mixtures thereof. The preferred diluent is isobutane. The diluent can be under liquid or super critical state.

The polymerization of the mPE used in the present invention can be conducted in a continuous reactor. The continuous reactor is preferably a loop reactor. During the polymerization process, at least one monomer, the catalytic system and a diluent are flowed in admixture through the reactor.

Alternatively for a bimodal production of mPE, two reactors in series can be used.

In the present invention average molecular weights can be further controlled by the introduction of some amount of hydrogen or by changing the temperature during polymerization. When hydrogen is used it is preferred that the relative amounts of hydrogen and olefin introduced into the polymerization reactor be within the range of about 0.001 to 15 mole percent hydrogen and 99.999 to 85 mole percent olefin based on total hydrogen and olefin present, preferably about 0.02 to 3 mole percent hydrogen and 99.98 to 97 mole percent olefin.

Standard additives such as antioxidants may be used for both long term and processing stabilization and if desired, one or more pigments and/or dyes and/or processing aids like fluoro elastomers can also be added.

Antistatic, antifog, antiblocking or slip additives may also be added.

According to embodiments of the present invention, compositions of LDPE and mPE are obtained either by preliminary dry blend or extrusion or by direct blend in the hopper or via the extruder.

The present invention further provides the use of the homogeneous blend according to the present invention to produce a monolayer blown film or one or more layers of a multilayer blown film wherein said layers are arranged in any order.

The present invention still further provides films, prepared with the blend of the present invention, characterised by:

- a shrinkage value in transverse direction of more than at least 5%, preferably of more than at least 10% compared to LLDPE/LDPE films extruded in the same conditions as those us for the blend of the present invention.
- a cohesion force in transverse direction at room temperature greater than of at least 5%, preferably greater than 10% compared to LDPE/LLDPE films.
- a shrink speed value of at least 10% more preferably at least 20% faster than LDPE/LLDPE films.
- A gloss at an angle of 45° of at least 60 and a haze of less than 10%. while keeping a good rigidity and being easily processable.

In the present invention, a good rigidity means e.g. that for a mPE/LDPE blend according to the invention, a secant modulus at 1% of deformation according to ASTM D-882 is:

- at least of 200 mega Pascal for a mPE/LDPE blend having a density of 0.920 g/cm$^3$.
- at least of 230 mega Pascal for a mPE/LDPE blend having a density of 0.923 g/cm$^3$.
- at least of 260 mega Pascal for a mPE/LDPE blend having a density of 0.926 g/cm$^3$.
- at least of 320 mega Pascal for a mPE/LDPE blend having a density of 0.930 g/cm$^3$, the secant modulus at 1% of deformation according to ASTM D-882 for the pure LDPE being of 200 mega Pascal.

As a consequence of a higher shrinkage in transverse direction and a higher cohesion force of the film produced according to the invention and caused by the high DRI mPE, it will be possible to make thinner shrink film leading to a significant cost reduction.

Increasing the shrink speed of the film produced according to the invention is particularly interesting because it results either in higher shrink-wrapping packaging rates or in decreasing the temperature of the oven during the packaging wrapping process, both results leading to a significant cost reduction.

The blend as described here above may also be used in the production of lamination films, barrier films and reticulation applications.

These films may also be metallized, corona treated, printed and laminated.

EXAMPLES

1. Polymerization Procedure and Product Composition.

The polymerization of the mPE (R1) used in the blend of the present invention was carried out in a liquid-full slurry loop reactor. Ethylene was injected with 1-hexene together with the catalyst. Isobutane was used as diluent. The polymerization conditions are indicated in Table I

TABLE I

| | Resin R1 |
|---|---|
| C2 feed (kg/h) | 3900 |
| C6 feed (g/kg C2) | 22 |
| H2 feed (g/t) | 42 |
| Iso C4 feed (kg/h) | 1940 |
| Tibal conc (ppm) | 100–200 |
| T. pol (° C.) | 90 |

C2 = ethylene
C6 = 1-hexene
Iso C4 = isobutane
Tibal = triisobutylaluminium

The bridged metallocene catalyst used was ethylene bis (tetrahydro-indenyl) zirconium dichloride R1 produced according to the above polymerization conditions is a high DRI mPE.

The data concerning R1 in comparison with a purely linear metallocene medium density from Phillips identified as Marlex mPact D350® are summarised in Table II.

TABLE II

| | R1 | Marlex mPact D350 ® |
|---|---|---|
| Density g/cm$^3$ | 0.934 | 0.933 |
| $MI_2$ g/10 min | 0.9 | 0.9 |
| DRI | 36 | 0 |
| SR2 = HLMI/$MI_2$ | 30 | 16 |
| D (Mw/Mn) | 3.28 | 2.88 |

The DRI of R1 and Marlex mPact D350® were determined by fitting the generalized Cross equation on the complexe viscosity measured according to ASTM D4440 by using a RDA 700 from Rheometrics, a diameter plate-plate of 25 mm and a gap between plates of 2 mm +/−0.2 mm. The apparatus was callibrated according to ARES Instrument normal 902-30004 The rheological measurements were performed at 190° C. under nitrogen and at 10% of strain.

2. Blends Preparation.

A blend B1 according to the invention was prepared by mixing 30% by weight of mPE (R1) and 70% by weight of LDPE A blend B2 according to the invention was prepared with the same ingredients in different proportions: 70% by weight of R1 and 30% by weight of LDPE.

A comparison blend B3 was prepared by mixing 30% by weight of LLDPE and 70% by weight of LDPE A comparison blend B4 was prepared by mixing 30% by weight of the Marlex mPact D350® from Phillips and 70% by weight of LDPE.

The LDPE used in all the blends is characterised by a density of 0.924 g/cm$^3$ and a $MI_2$ of 0.8 g/10 min The LLDPE used in comparison blend B3 is a Ziegler-Natta LLDPE characterised by a density of 0.918 g/cm$^3$, a DRI of 0.6 and a molecular weight distribution (Mw/Mn) of 4.1.

3. Films Preparation.

Six films were blown on a Macchi blown film line equipment using a low density configuration characterised by a die of 120 mm, a blow up ratio of 2.5:1 and a die gap of 0.8 mm. All the films were down-gauged to a thickness of 40 microns.

Films F1 and F2 were prepared from the blend B1 and B2 according to the invention.

Films F3 and F4 were prepared from the comparative blends B3 and B4.

Film F5 was prepared from pure LDPE

Film F6 was prepared from pure resin R1

4. Films Properties.

The shrinkage in machine direction (MD) and transverse direction (TD) was measured by immersion of the film in a bath of hot oil at 140° C. during 2 minutes according ASTM D2732.

The percentage of shrinkage for each direction (MD and TD) of the six films are given in table III

TABLE III

| Films | Component | % weight | Shrinkage MD (%) | Shrinkage TD (%) |
|---|---|---|---|---|
| F1 | R1/LDPE | 30/70 | 71 | 39 |
| F2 | R1/LDPE | 70/30 | 69 | 37 |
| F3 | LLDPE/LDPE | 30/70 | 70 | 36 |
| F4 | mPact D350 ®/LDPE | 30/70 | 70 | 33 |
| F5 | LDPE | 100 | 70 | 42 |
| F6 | R1 | 100 | 63 | 25 |

Pure LLDPE and Marlex mPact D350® could not be extruded by using a narrow die gap of 0.8 mm as desribed here above for the films F1 to F6. This is why no shrink results are given for those pure resins. In contrast pure high DRI mPE (R1) could be extruded under those conditions. Moreover even pure it exibits good shrinkage in TD direction.

It can also be observed from table III that the addition of high DRI mPE to LDPE increases the shrinkage of the film (F1) in transverse direction compared to films (F3 and F4) produced from LLDPE/LDPE and mPact D350®/LDPE blends.

Table III shows clearly that the good shrink property in transverse direction is brought by the LDPE (film F5). For the shrink in machine direction, all the blends studied (F1 to F4) exhibited the same behaviour.

It is surprising that when the high DRI mPE is used even in high concentration with LDPE the film produced (F2) still exibits better shrinkage in transverse direction compared to the films using much more LDPE (F3 and F4).

The cohesion force exerted by the film after shrink and cooling the film at room temperature was measured according to ISO 14616 method by setting the films in an oven at 180° C. during 17 seconds. The cohesion force was then measured at room temperature for each film in the machine direction (MD) and transverse direction (TD). Those forces are expressed in Newton (N).

The measurement results are shown in table IV.

TABLE IV

| Films | Components | % weight | MD Cohesion F. (N) | TD Cohesion F. (N) |
|---|---|---|---|---|
| F1 | R1/LDPE | 30/70 | 1.102 | 0.835 |
| F2 | R1/LDPE | 70/30 | 1.21 | 1.01 |
| F3 | LLDPE/LDPE | 30/70 | 0.902 | 0.622 |
| F4 | mPact D350 ®/LDPE | 30/70 | 1.1 | 0.62 |
| F5 | LDPE | 100 | 0.85 | 0.722 |
| F6 | R1 | 100 | 1.354 | not applicable |

When added to LDPE it is seen that LLDPE and mPact D350® increase the cohesion force of the film in machine direction (MD) but decrease it in transverse direction (TD) compared to pure LDPE (F3 and F4 versus F5). Contrary the high DRI mPE/LDPE blend not only increases substantially the cohesion force of the film in machine direction but also increases the cohesion force in transverse direction (TD) when compared to pure LDPE (F1 versus F5). Both cohesion forces are further increased when increasing amount of high DRI mPE with LDPE (F2 versus F1).

The cohesion force of the film issued from the LLDPE/LDPE blend is partly related to the molecular weight distribution (D) defined as the ratio between the average molecular weight by weight (Mw) and the average molecular weight by number (Mn) of the LLDPE. Higher is the molecular weight distribution of the LLDPE, better will be the cohesion force of the film. It is remarkable that the blend according to the invention while using a mPE having a narrower molecular weight distribution compared to the LLDPE (3.28 versus 4.1) allows to get films with a better cohesion force than that produced from LLDPE/LDPE blend (F1 and F 2 versus F3).

It has also been unexpectetly found that the shrink speed in the machine direction of the film produced according to the blend of the invention is higher compared to those of the films produced from the LDPE/LLDPE and from the mPact D350® blends. Table V illustrates this result.

TABLE V

| Films | MD shrink time (s) | MD Elmendorff Tear (N/mm) | Gloss 45° | Haze (%) | Secant modulus (mPa) |
|---|---|---|---|---|---|
| F2 (example) | 15 | 33.5 | 60.7 | 7.3 | 280 |
| F3 (comparative) | 20 | 25 | 57.4 | 8.3 | 189 |
| F4 (comparative) | 20 | — | 57.4 | 8.3 | 189 |

Besides a shorter shrink time, a higher MD Elmendorf tear resistance, a better rigidity, a better gloss at 45° C. and less haze are also observed for the film produced according to the invention.

It is unexpected and remarkable that it is the film according to the invention that give higher tear resistance and better optical properties even if the density of the blend produced according to the invention is higher than that of the comparative blend The Elmendorf tear was measured using the method of ASTM D-1922.

The gloss was measured at an angle of 45° with the Byk-Gardner micro-gloss reflectometer according to ASTM D2457, the haze was measured with the Byk-Gardner Hazegard® system according to ASTM D-1003.

The MD shrink time was measured using the method ISO 14616.

The Secant modulus at 1% of deformation was measured according to ASTM D-882.

The invention claimed is:

1. A polyethylene composition comprising a homogenous blend of a low density polyethylene with a metallocene-catalyzed polyethylene having a density of at least 0.906 $g/cm^3$ and a Dow Rheology Index of at least $5/MI_2$, wherein $MI_2$ is the melt index measured according to ASTMD-1238 condition 190° C./2.16 kg and the Dow Rheology Index being determined by a dynamic rheological analysis performed at 190°, said metallocene-catalyzed polyethylene being catalyzed with a catalyst system comprising a metallocene component and an activating agent selected from the group consisting of an alumoxane or an aluminum alkyl providing a mole ratio of aluminum to the transition metal of said metallocene component within the range of 50:1-300:1.

2. The composition of claim 1 wherein the metallocene-catalyzed polyethylene has a Dow Rheology Index of at least $10/MI_2$.

3. The composition of claim 1 wherein the metallocene-catalyzed polyethylene has a Dow Rheology Index of at least $20/MI_2$.

4. The composition of claim 1 wherein the metallocene-catalyzed polyethylene has a density of from 0.925 $g/cm^3$ to less than 0.965 $g/cm^3$.

5. The composition of claim 4 wherein the metallocene-catalyzed polyethylene has a Dow Rheology Index of at least $10/MI_2$.

6. The composition of claim 4 wherein the metallocene-catalyzed polyethylene has a Dow Rheology Index of at least $20/MI_2$.

7. The composition of claim 1 wherein the metallocene-catalyzed polyethylene has a density of from 0.906 $g/cm^3$ to less than 0.925 $g/cm^3$.

8. The composition of claim 7 wherein the metallocene-catalyzed polyethylene has a Dow Rheology Index of at least $10/MI_2$.

9. The composition of claim 7 wherein the metallocene-catalyzed polyethylene has a Dow Rheology Index of at least $20/M_2$.

10. A blown film comprising at least one layer formed of a polyethylene composition comprising a homogenous blend of a low density polyethylene with a metallocene-catalyzed polyethylene having a density of at least 0.906 $g/cm^3$ and a Dow Rheology Index of at least $5/MI_2$, wherein $MI_2$ is the melt index measured according to ASTMD-1238 condition 190° C./2.16 kg and the Dow Rheology Index being determined by a dynamic rheological analysis performed at 190°, said metallocene-catalyzed polyethylene being catalyzed with a catalyst system comprising a metallocene component and an activating agent selected from the group consisting of an alumoxane or an aluminum alkyl providing a mole ratio of aluminum to the transition metal of said metallocene component within the range of 50:1-300:1.

11. The film of claim 10 wherein said layer is a monolayer blown film.

12. The film of claim 10 wherein said layer comprises at least one layer of a multilayer blown film.

13. A process for the preparation of a blown film, forming said film in a blown film line from a polyethylene composition comprising a homogenous blend of a low density polyethylene with a metallocene-catalyzed polyethylene having a density of at least 0.906 $g/cm^3$ and a Dow Rheology Index of at least $5/MI_2$, wherein $MI_2$ is the melt index measured according to ASTMD-1238 condition 190° C./2.16 kg and the Dow Rheology Index being determined by a dynamic rheological analysis performed at 190°, said metallocene-catalyzed polyethylene being catalyzed with a catalyst system comprising a metallocene component and an activating agent selected from the group consisting of an alumoxane or an aluminum alkyl providing a mole ratio of aluminum to the transition metal of said metallocene component within the range of 50:1-300:1, said film being characterized by:

a cohesion force in the transverse direction at room temperature of at least 5% greater than the cohesion force in the transverse direction of a corresponding biaxially-oriented film formed of said low density polyethylene in a pure form; and a gloss at an angle of 45° of at least 60 and a haze of less than 10% while keeping a good rigidity.

14. A biaxially-oriented film which has been oriented in the machine direction and the transverse direction, formed from a homogenous blend of a polyethylene composition comprising a homogenous blend of a low density polyethylene with a metallocene-catalyzed polyethylene having a density of at least 0.906 g/cm$^3$ and a Dow Rheology Index of at least $5/MI_2$, wherein $MI_2$ is the melt index measured according to ASTMD-1238 condition 190° C./2.16 kg and the Dow Rheology Index being determined by a dynamic rheological analysis performed at 190°, said metallocene-catalyzed polyethylene being catalyzed with a catalyst system comprising a metallocene component and an activating agent selected from the group consisting of an alumoxane or an aluminum alkyl providing a mole ratio of aluminum to the transition metal of said metallocene component within the range of 50:1-300:1, said film having a cohesion force in the transverse direction which is greater than the cohesion force in the transverse direction of a corresponding biaxially-oriented film formed of said low density polyethylene in a pure form.

15. The biaxially-oriented film of claim 14, wherein said film has a cohesion force in the machine direction which is greater than the cohesion force in the machine direction of the corresponding film formed of said low density polyethylene in a pure form.

16. The film of claim 15, having a gloss at an angle of 45° of at least 60, and a haze which is less than 10%.

17. A blown film comprising at least one layer of the polyethylene composition of claim 4.

18. The blown film of claim 17 wherein the metallocene catalyzed polyethylene has Dow Rheology Index of at least $10/MI_2$.

19. A biaxially oriented film which has been oriented in the machine direction and the transverse direction, formed from the polyethylene composition of claim 4 wherein said film has a cohesion force in the transverse direction which is greater than the cohesion force in the transverse direction of a corresponding biaxially-oriented film formed of said low density polyethylene in a pure form.

20. THe biaxially-oriented film of calim 19, wherein said film has a cohesion force in the machine direction which is greater than the cohesion force in the machine direction of the corresponding film formed of said low density polyethylene in a pure form.

* * * * *